United States Patent
Fenton

[15] 3,668,289

[45] June 6, 1972

[54] KEY TELEPHONE SYSTEM LINK SWITCHING NETWORK

[72] Inventor: Francis Michael Fenton, Boulder, Colo.

[73] Assignee: Bell Telephone Laboratories, Incorporated, Murray Hill, N.J.

[22] Filed: Aug. 3, 1970

[21] Appl. No.: 60,505

[52] U.S. Cl. ....................179/1 CN

[51] Int. Cl. ....................H04m 3/56

[58] Field of Search ....................179/1 CN, 18 BC, 99

[56] References Cited

UNITED STATES PATENTS 3,524,929 8/1970 Burns et al. ....................179/1 CN

*Primary Examiner*—William C. Cooper

*Attorney*—R. J. Guenther and James Warren Falk

[57] ABSTRACT

A conference link for a plurality of telephone station sets is disclosed which eliminates the need for battery feed coils by switching in a current supply transistor respective to each telephone set incident to connecting that set to the link. The current supply transistor is biased for constant current operation to provide an additional increment of constant current for each telephone set communicating over the link.

12 Claims, 3 Drawing Figures

INVENTOR
F. M. FENTON
BY Howard R Popper
ATTORNEY

KEY TELEPHONE SYSTEM LINK SWITCHING NETWORK

BACKGROUND OF THE INVENTION

This invention relates to telephone switching systems and more particularly to a conference link or network for connecting two or more telephone stations together for communications purposes.

Recently, the telephone industry has seen a resurgence of effort directed to improving key telephone station systems which effort embraces modernization of station set equipment, reduction in the amount and complexity of cabling and the provision of additional services to users. Key station system users have from time to time indicated that the inclusion of the ability to make conference calls among the station sets would be a desirable service objective. Heretofore, however, conference arrangements have required sophisticated multiport hybrid circuits, too expensive to be used in the smaller installations. Even in those installations where there would be no need for the amplification that necessitates the use of a hybrid circuit, it has heretofore been necessary to employ battery feed coils to isolate the low a.c. impedance talking battery from the voice frequency components of the speech paths. While battery feed coils are not particularly expensive, they are large and bulky and cannot be manufactured using the integrated circuit techniques that would otherwise be the key to mass production of compact telephone circuit equipment.

Another of the problems required to be solved in extending conference service to key station telephone sets is the provision of an adequate amount of talking current. In normal telephone service where only two station sets are in communication with each other, the amount of talking current required is predeterminable. But conference service necessarily demands the flexibility of having two, three, four or perhaps more stations connected together on a common communications channel and so the current demand will vary from call to call.

Accordingly, it is an object of my invention to provide a conference link capable of providing appropriate talking current to any number of telephone stations that are to be connected to the link.

It is another object of the present invention to eliminate the need for any battery feed coils.

SUMMARY OF THE INVENTION

The foregoing and other objects of my invention are achieved in one illustrative embodiment in which I provide a switchable constant current source for each telephone station set appearing in the link. When the telephone set is connected to the link, its associated constant current source is cut in thereby providing that set with its required amount of operating current. I connect the constant current source for each telephone set in such a manner that the modulation produced by the talking station will be reflected in corresponding modulations in the current flowing through branches containing other telephone stations connected to the talking link but no modulation in the total current supplied by any station's constant current source.

In accordance with one aspect of the illustrative embodiment, I provide a conference link containing a transistor for each station set. The link contains a tip bus and a ring bus, the collector of each such transistor that is respective to a station set being connected to the ring bus. One side of each station set is also connected to the ring bus. When it is desired to establish a communications connection among two or more station sets in the link, the emitter-base junction of each such station set's transistor is connected to a Zener diode circuit which biases the respective station set's transistor for constant current operation. Simultaneously, the other end of the station set is connected to the tip bus of the link. When the respective transistor for a station set is connected to the Zener diode, the transistor is turned on and supplies an increment of current to the ring conductor. This increment is sufficient to supply the talking current for the microphone of its respective station set. However, each such transistor provides a high a.c. impedance to the ring conductor so that talking current fluctuations produced by one telephone set's microphone will be reflected primarily in corresponding fluctuations in the receiver of other stations that have been connected to the link without producing any substantial fluctuation in the collector current of any of the transistors.

DESCRIPTION OF THE DRAWING

The foregoing and other objects and features of the present invention may be more clearly understood from a reading of the following description of the illustrative embodiment and drawing in which.

DETAILED DESCRIPTION

Figure 1:
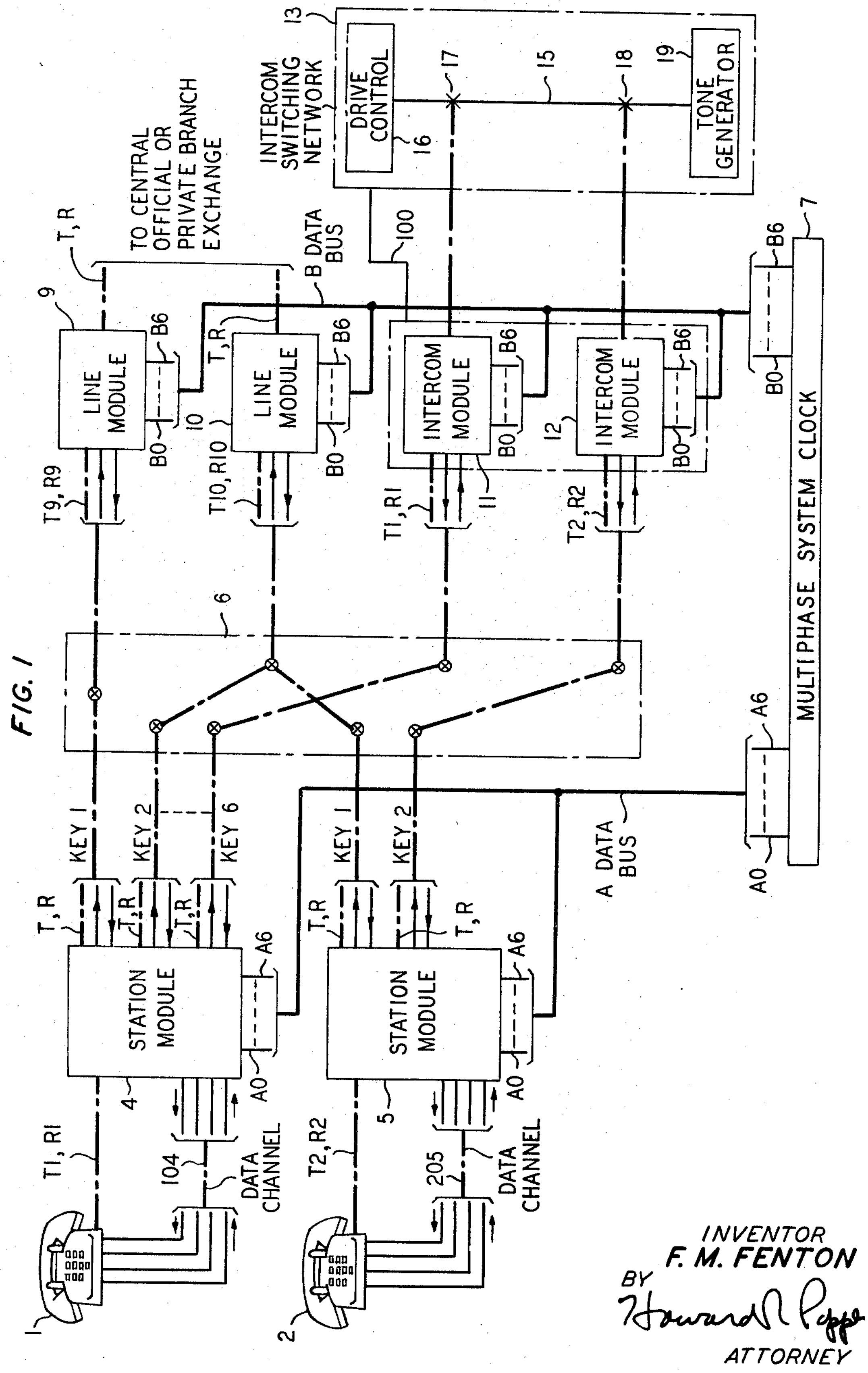
FIG. 1 shows a block diagram of an electronically controlled key telephone system in which my conference link may find application.

Referring now to FIG. 1, there is shown an illustrative electronically controlled key telephone system in which the conference, link arrangement of the present invention may find application. An example of such a key telephone system may be found in the copending application of D.J.H. Knollman and J. L. Simon, Ser. No. 43,812, filed June 5, 1970, entitled "A Modular Key Telephone System Having a Distributed Processor Organization." Another system in which the apparatus of the present invention may be employed is the key telephone system disclosed in D.J.H. Knollman, Ser. No. 726,062 filed May 2, 1968, now U.S. Pat. No. 3,549,820 issued Dec. 22, 1970, entitled "Key Telephone Station Concentrator."

In the illustrative key telephone system, each of the plurality of key telephone station sets 1, 2 is associated with a respective station module 4, 5.

Between each of the station sets and its associated station module are the tip and ring leads T1, R1, T2, R2 and a respective four-conductor cable 104, 205 for two-way data transmission. The status of any station set key button may be transmitted from a station set to its associated station module over one pair of leads in the data cable and information from the station module concerning the illumination of key buttons corresponding to off-hook, ringing or held lines that can be picked up by operating such buttons is transmitted over the other pair of data leads. As described in the first of the above-mentioned applications, information for controlling the station modules may be transmitted from a multiphase system clock 7 over a seven conductor "A data" bus. Also as described therein, the station modules can be cross-connected through cross-connection network 6 with any of a plurality of line modules or service modules for associating each key button position on a telephone set with a respective telephone line or key telephone system service. Thus, for example, the terminals of station module 4 that are associated with keys 1 and 2 of set 1 are shown cross-connected in network 6 to line modules 9 and 10, respectively, for providing station set 1 with pick-up access to two different central office lines. Conversely, line module 10 is cross-connected with station module 5 so that its associated central office line can also be picked up by key 1 of station set 2. The line modules, as described in the above-mentioned Knollman-Simon application receive control signals from multiphase system clock 7 over the seven conductor cable of the "B data" bus.

Intercom service may also be one of the services made available to the key telephone stations of the foregoing Knollman-Simon system by providing a plurality of intercom modules 11, 12 that can be cross-connected through network 6 to a station module terminal corresponding to an intercom key on any of the station sets in the key system. The circuitry of such intercom modules, not being a part of the present invention, will not be described herein in detail. Briefly, however, when an intercom key at one of stations 1 or 2 is depressed, the respective one of intercom modules 11 or 12, under control of the signals appearing on the B data bus accesses intercom switching network 13. Network 13, in accordance with my present invention comprises a conference link 15, the details of which are shown in FIG. 2, that need contain no battery feed coils and which permits conference calls or interconnection among different groups of stations on an economical basis through the use, advantageously, of integrated circuit techniques.

Figure 2:
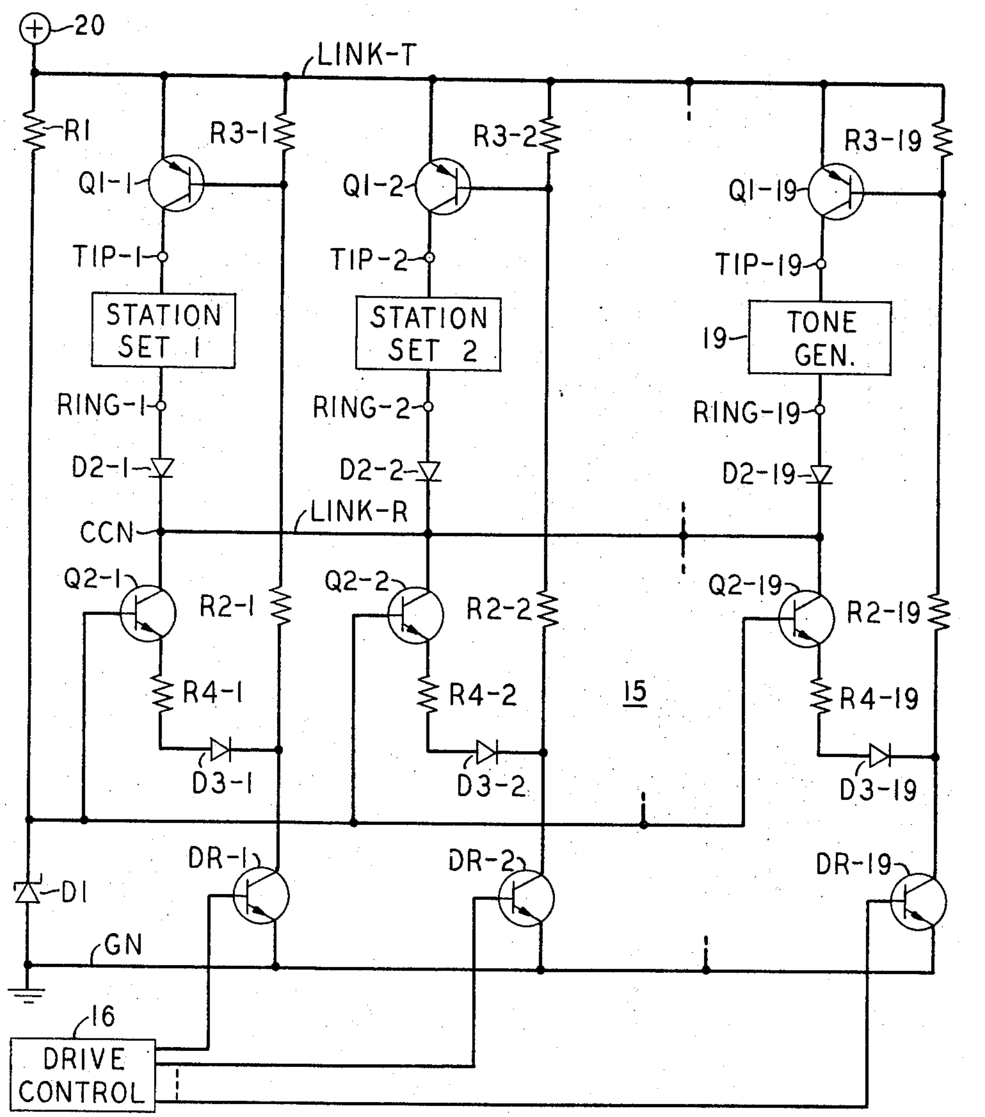
FIG. 2 shows the details of the conference link circuitry of my invention.

Referring now to FIG. 2 there is shown the conference link circuit 15 of my invention. Station sets 1 and 2 of FIG. 1 are shown as being connected between the terminals labeled TIP–1 and RING–1 and TIP–2 and RING–2, respectively, the intervening paths through intercom modules 11 and 12 and cross-connection network 6 being omitted from FIG. 2 for the sake of clarity. Station set 2 is likewise shown connected between terminals TIP–2 and RING–2. Tone generator 19 of FIG. 1 is shown connected between terminals TIP–19 and RING–19. An unregulated current source 20 is connected to conductor LINK–T.

When a station set, such as set 1 requests an intercom connection, its associated intercom module 11 (FIG. 1) will signal network 13 over lead 100. An allotter circuit (not shown) in network 13 activates drive control 16. Drive control 16 will apply a forward biasing voltage to the base of transistor DR–1 in link 15 that is associated with station set 1. Transistor DR–1 is turned on, a current path being traceable from battery, bus LINK–T, resistor R3–1, resistor R2–1 and the collector-emitter pair of transistor DR–1 to ground. The voltage drop across a resistor R3–1 turns on transistor Q1–1 which connects terminal TIP–1 to bus LINK–T. Transistor DR–1 in the ON condition also completes a path for connecting the base-emitter junction of transistor Q2–1 across Zener diode D1. Diode D1 provides a constant voltage to the base of Q2–1 and transistor Q2–1 turns on. A current path may now be traced from battery, bus LINK–T, the collector-emitter junction of transistor Q1–1, station set 1, diode D2–1, terminal CCN, the collector-emitter junction of transistor Q2–1, resistor R4–1, diode D3– 1 and the collector-emitter junction of transistor DR–1 to ground. Accordingly, steady-state talking current for operating the microphone of station set 1 is supplied.

Resistor R1 is chosen to place Zener diode D1 in that portion of the operating characteristic where the voltage which diode D1 applies to the base of transistor Q2 will be slightly less than the minimum collector voltage which transistor Q2 will experience under operating conditions.

In a manner not necessary to be described herein, the party at station set 1 designates the other station or stations to be included in the communications conferees connection and pursuant to such designation drive control 16 then turns on the DR- transistor corresponding to each desired conferee's telephone set. Assuming, for example, that station set 2 is a desired conferee station, drive control 16 would turn on transistor DR–2 in the same manner that it had priorly turned on transistor DR–1. The operation of the circuitry including transistors Q1–2 and Q2–2 associated with station set 2 is substantially identical to that of the circuitry associated with station set 1. Accordingly, the ensuing description will be made with respect to the circuitry associated with station set 1.

Since Zener diode D1 maintains the base emitter potential of current supply transistor Q2–1 constant, transistor Q2–1 will provide a constant current into node CCN. Similarly, with transistor DR–2 in the on condition, the base emitter junction of transistor Q2–2 associated with station set 2 is also connected across Zener diode D1. Thus, transistor Q2–2 also uses a current supply transistor and it supplies an additional constant increment of current to node CCN. When the telephone customer at station set 1 speaks into the microphone of his telephone set, the impedance of set 1 undergoes changes in accordance with the amplitude of the audio signal delivered into the microphone. The impedance of telephone set 1 varying at the audio rate causes the current between terminal TIP–1 and TIP–2 to vary at a corresponding audio rate. For successful communication among station sets 1 and 2, it is desired that as great an amount as possible of this undulating modulated current be transferred from the microphone of station set 1 to the receiver of station set 2 and to the receivers of any other telephone sets whose DR– transistors have been turned on by drive control 16. With transistors Q1–1 and Q1–2 turned on, terminals TIP–1 and TIP–2 of station sets 1 and 2, respectively, are each connected together via bus LINK–T. With transistors Q2–1 and Q2–2 turned on, diodesD2–1 and D2–2 are forward biased and therefore terminals RING–1 and RING–2 of the station set are effectively connected together via bus LINK–R. Similarly, other station sets, not shown, in the link may be connected together for communications purposes. Of course, as each additional station set is connected between the communications bus conductors LINK–T and LINK–R, an additional increment of current is supplied to operate that station set's microphone by the associated Q2– current supply transistor.

In addition to connecting station sets together for speech purposes, the link of FIG. 2 also shows a tone generator 19 that can be connected across the link conductors for supplying audible tone to the station sets. Tone generator 19 is connected to the link and supplied the operating current by its respective current supply transistor Q2–19 when transistor DR–19 is turned on by drive control 16. It only remains to demonstrate that the impedance which each such Q2– current supply transistor presents to the station sets is a much higher impedance than that which the station sets present to each other so that the effective impedance of the current supply transistors is high enough not to unduly shunt down the audio modulation component of current transmitting information over the communications buses.

Preliminary to the analysis of the impedance presented to the communications buses by the current supply Q2– transistors, it will be helpful if illustrative values will be given for the circuit parameters in FIG. 2. Most conventional telephone sets when operated from a 24-volt source will require approximately 25 mA of quiescent dc current. The dc impedance of a typical telephone set will be approximately 120 ohms but sets may be found in practice having a dc impedance anywhere in the range from 100 to 300 ohms. Accordingly, for conservative design, it was assumed in the illustrative embodiment that the station set required 30 mA of quiescent current and had an internal impedance (dc) of 300 ohms. Assuming a 24-volt supply, the minimum voltage at the collector of a Q2 transistor is expressible by the relationship $$V_{C_{Q2}} = 24 - (I_C R_{STATION} + V_{DIODE\ D2} + V_{CE\ SAT_{Q1}}) \text{ or}$$
$$= 24 - (30\ \text{mA} - 300 + 0.7 + 0.3)$$
$$= 14$$

In order that the current supply Q2 transistor be maintained in the on condition, the potential of the base should be less than 14 volts and a Zener diode D1 is selected such as a type 426P diode that has a breakdown voltage of 12 volts. Resistor R1 is then selected to provide the current required by the Zener diode to exhibit the latter potential. A type 426P diode exhibits approximately 12 volts when carrying a 20 mA current thereby establishing that R1 should have a value of approximately 600 ohms.

For current supply transistor Q2– to supply 30 mA to node CCN for its associated telephone set, the emitter current of the Q2 transistor which will also be approximately 30 mA id determined by the size of its associated R4 resistor in the following manner:

$$R_4 = \frac{V_{E_{Q2}} - V_{\text{DIODE } D3} - V_{CE\ SAT_{DR-}}}{30\ \text{mA}}$$
$$= \frac{11.4 - 0.7 - 0.3}{30}$$
$$= \text{approximately } 360 \text{ ohms.}$$

In the circuit, the value of the R3– resistors for turning on the Q1– transistors is calculated assuming a 1-volt potential drop across the emitter base junction of the Q1 transistor and R3 is selected to limit the current to 1 mA. Under these circumstances, R3 in the illustrative embodiment is 1,000 ohms. R2 is calculated to absorb the voltage drop produced by the sum of the 1 mA base current of Q1– and the 1 mA current through R3– assuming a 3/10-voltage drop in the emitter-collector path of the associated DR- transistor. Illustratively, R2 may have a value of approximately 11 kilohms.

Figure 3:
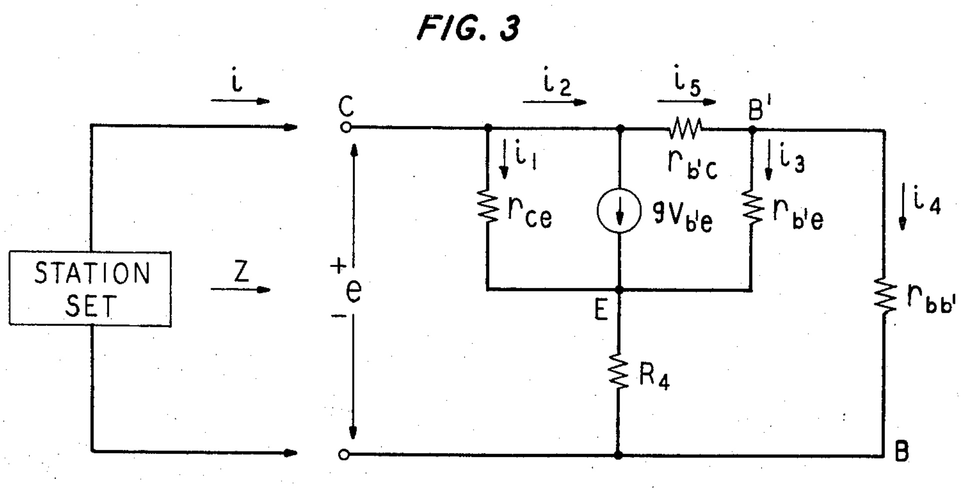
FIG. 3 shows a hybrid-pi equivalent circuit of a portion of FIG. 2.

The impedance which a Q12 transistor presents to node CCN may be calculated by employing the well-known hybrid-pi model described in *Pulse Digital and Switching Waveforms* by Millman and Taub, McGraw-Hill 1965 at pages 7 and 8. Transistor Q2 is connected to node CCN in the common base configuration. The impedance which a telephone set sees is the impedance looking into the collector base terminals of the Q2 transistor circuits. Referring to the above-noted book by Millman and Taub, the hybrid-pi model for the transistor at page 7 thereof may be modified by including in the circuit, therefore, the effective emitter-circuit resistance for the Q2– transistor. This emitter-circuit resistance comprised primarily of resistor R4. The circuit on page 7 of the Millman and Taub book is for the common emitter configuration. The circuit may be modified to reflect the common base configuration of the Q2– transistor by connecting R4 between the emitter and base terminals and by considering that the telephone set sees the impedance between the collector and the end of R4 not connected to the aforementioned emitter terminal. The impedance looking into these terminals will then be the voltage appearing therebetween $e$ divided by the input current $i$. Referring then to the current $i_1$, $i_2$, $i_3$, $i_4$, and $i_5$ shown in FIG. 3, the input voltage e is given by $$e = i_1 (R_4 + r_{ce}) + (gV_{b'e} + i_3) R_4 \qquad (1)$$

$$e = i_5 r_{b'c} + i_4 r_{bb'} \qquad (2)$$

$$e = i_5 r_{b'c} + i_3 r_{b'e} + R_4 (i_1 + gV_{b'e} + i_3) \qquad (3)$$

combining equations and noted that $V_{b'e} = i_3 r_{b'e}$ and that $g = \beta / r_{b'e}$, we have:

$$e = (r_{ce} + R_4) i_1 + (R_4\beta + R_4) i_3 \qquad (4)$$

$$e = (R_4) i_1 + (r_{b'e} + R_4 + R_4\beta) i_3 + (r_{b'c}) i_5 \qquad (5)$$

$$e = -(r_{bb'}) i_3 + (r_{b'c} + r_{bb'}) i_5 \qquad (6)$$

By employing an oscilloscope and the technique described in *Handbook of Basic Transistor Circuits and Measurements*, John Wiley 1966 pages 115–129, the following is obtained:

$\beta = 80$ $h_{oe} = 0.8\ \text{m}\Omega$ $h_{ie} = 100\ \Omega$ $h_{re} = 3 + 10^{-4}\ \Omega$ $g = 0.865$ therefore $r_{b'e} = \beta/g = 80/0.865 = 92\ \Omega$ $r_{bb'} = h_{ie} - r_{b'e} = 100 - 92 = 8\ \Omega$ $r_{b'c} = r_{b'e}/h_{re} = 92/3 \times 10^{-4} = 310\text{K}$ $r_{ce} = [h_{oe} - (1 + h_{fe})\ g_{b'c}]^{-1} = [.8 \times 10^{-3} - (81)(.326 \times 10^{-5})\text{A}]^{-1}$ $r_{ce} = [(0.8 - 0.264) \times 10^{-3}]^{-1} = 1.87\text{K}$ Forming the determinant for $i_1$ from the foregoing equations we have:

$$i_1 = \frac{\begin{vmatrix} e & R_4(\beta+1) & 0 \\ e & R_4(\beta+1) + r_{b'e} & r_{b'c} \\ e & -r_{bb'} & r_{b'c} + r_{bb'} \end{vmatrix}}{\begin{vmatrix} r_{ce} + R_4 & R_4(\beta+1) & 0 \\ R_4 & R_4(\beta+1) + r_{b'e} & r_{b'c} \\ 0 & -r_{bb'} & r_{b'c} + r_{bb'} \end{vmatrix}}$$

Substituting values into the foregoing equations, we obtain for the denominator, Δ the following expression:

$$\Delta = \begin{vmatrix} 2.2\text{K} & 29.2\text{K} & 0 \\ 360 & 29.3\text{K} & 310\text{K} \\ 0 & -8 & 310\text{K} \end{vmatrix}$$

or $$\Delta \approx 2 \times 10^{13}$$

Accordingly, current $i_1$ may be expressed as:

$$i_1 = \frac{\begin{vmatrix} e & 29.2 \times 10^3 & 0 \\ e & 29.3 \times 10^3 & 310 \times 10^3 \\ e & -8 & 310 \times 10^3 \end{vmatrix}}{2 \times 10^{13}}$$

therefore $$i_1 = e(4.55 \times 10^{-4})$$

The expression for current $i_3$ may be given as:

$$i_3 = \frac{\begin{vmatrix} 2.2 \times 10^3 & e & 0 \\ 360 & e & 310 \times 10^3 \\ 0 & e & 310 \times 10^3 \end{vmatrix}}{\Delta}$$

therefore, $$i_3 = -e(5.58 \times 10^{-6})$$

The expression for current $i_5$ is:

$$i_5 = \frac{\begin{vmatrix} 2.2 \times 10^3 & 29.2 \times 10^3 & e \\ 360 & 29.3 \times 10^3 & e \\ 0 & -8 & e \end{vmatrix}}{\Delta}$$

Therefore:

$$i_5 = e(27 \times 10^{-7})$$

$$V_{b'e} = i_3 r_{b'e}$$

$$= -e(5.58 \times 10^{-6}) \times 92$$

therefore, $V_{b'e} = -e(515 \times 10^{-6})$. Now, $i_2$ is given by $i_2 = gV_{b'e} + i_5$ therefore, $$i_2 = -0.865\ (515e \times 10^{-6}) + e(27 \times 10^{-7})$$

$$i_2 = -e[442.3 \times 10^{-6}]$$

Now:

$$Z = \frac{e}{i} = \frac{e}{i_1 - i_2}$$

therefore $$Z = \frac{e}{e}\left[\frac{1}{4.55 \times 10^{-4}}\right]$$

$$Z = 7.7 \times 10^4$$

$$Z = 77\ \text{kilohms}$$

Now, looking into the station set, the current sees impedance of:

$$Z = 600\,\Omega + 100\,\Omega \;/\!/\; 1\,K \;/\!/\; 11\,K,$$

where the first term is the 600 ac impedance of the station set and the second term represents the collector-emitter saturation impedance of transistor T1 in parallel with the 1 K resistance of R3 in parallel with the 11 K resistance of R2. Accordingly, the effective impedance looking into the station set is approximately 700Ω. The mismatch or db loss between a 77-kilohm source and a 700Ω load is given by:

$$\text{db loss} = 10\,\text{Log}_{10}(.7/77) = 10\,\text{Log}_{10}(1/110)$$
$$= 10\,[\text{Log}_{10}(1/100) + \text{Log}_{10}(1/111)]$$
$$= -20.5\text{ db}$$

Thus, I have shown a telephone link circuit in which despite the number of telephone sets connected for communication over the link at any time each set continues to be provided with its required talking battery current and the battery supply presents a high impedance to the talking currents to prevent undue attenuation thereof. The foregoing are illustrative of the principles of my invention. Further and other modifications will be apparent to those of skill in the art without departing from the spirit and scope of the invention.

What is claimed is:

1. A conference link for a plurality of telephone sets comprising
   a plurality of telephone sets each having a predetermined impedance,
   a pair of conductors for conveying intelligence among said telephone sets,
   a transistor respective to each of said telephone sets,
   an unregulated current source,
   means for selectively connecting said telephone sets and said transistor respective to each of said sets in circuit with said current source and said pair of conductors,
   a source of biasing potential, and
   means controlled by said connecting means for connecting said source of biasing potential to each of said transistors to cause said transistor to exhibit an impedance to said conductors substantially higher than said impedance of said telephone sets.

2. A conference link for a plurality of telephone sets comprising
   a pair of conductors for conveying intelligence among said telephone sets,
   a transistor respective to each of said telephone sets,
   an unregulated current source,
   a source of biasing potential,
   first and second switching means associated with each said station, said first switching means being operable to connect said station set to one of said pair of conductors, and
   said second switching means being operable to connect said transistor respective to said station between one of said pair of conductors and said unregulated current source and to said source of biasing potential.

3. A conference link according to claim 2 wherein said source of biasing potential comprises
   a Zener diode having one end thereof connected to the base of each said respective transistor and wherein said second switching means includes a further transistor respective to each of said telephone sets said further transistor being connected between the other end of said Zener diode and a current carrying electrode of said first-mentioned respective transistor.

4. A conference link according to claim 3 further comprising
   diode means connected between said station and the other of said pair of conductors.

5. A conference link according to claim 4 wherein said Zener diode is connected in circuit with the base emitter junction of said first-mentioned transistor respective to said telephone set by said second switching means.

6. A conference link according to claim 5 wherein said first switching means includes a transistor and wherein coupling means are provided for connecting one electrode of said transistor of said second switching means to a control electrode of said transistor of said first switching means.

7. A communications link comprising
   a pair of communications conductors,
   a plurality of telephone sets, an unregulated current source, a transistor having base, emitter and collector electrodes individual to each of said station sets, a source of constant bias potential, and switching means individual to each of said telephone sets for connecting the emitter and base electrodes of said respective transistor in circuit with said source of constant bias potential and for connecting the emitter and collector electrodes of said respective transistor in circuit between one of said pair of conductors and said source of current.

8. A line circuit comprising:
   a first and second conductor,
   a plurality of station sets connected between said conductors,
   a respective switching transistor connected between each of said station sets and one of said conductors and operable to deliver current to its associated station set from said conductor,
   a plurality of constant current sources equal in number to said station sets, and
   means for operatively connecting in a respective one of said constant current sources to supply an increment of current to said conductors each time one of said switching transistors is operated.

9. A link circuit according to claim 8 wherein each of said constant current sources comprises
   a transistor having its base emitter junction biased for constant current operation of its emitter collector path.

10. A link circuit according to claim 9 further including a Zener diode having one terminal thereof connected to bias the base of each of said transistors biased for said constant current mode of operation.

11. A link according to claim 10 further comprising a third transistor, said respective switching transistor and said respective transistor biased for constant current operation being simultaneously enabled by said third transistor.

12. A link according to claim 10 further comprising
   means connecting said third transistor to the base of said respective switching transistor and to the emitter of said respective transistor biased for said constant current mode of operation.

* * * * *